E. J. LEEDING AND A. A. REMINGTON.
DETACHABLE TREAD FOR WHEELS AND IN MEANS OF FIXING SAME.
APPLICATION FILED OCT. 17, 1916.

1,343,784. Patented June 15, 1920.

Inventors
Ernest John Leeding and
Alfred Arnold Remington
By
Attorney

UNITED STATES PATENT OFFICE.

ERNEST JOHN LEEDING AND ALFRED ARNOLD REMINGTON, OF BIRMINGHAM, ENGLAND.

DETACHABLE TREAD FOR WHEELS AND IN MEANS OF FIXING SAME.

1,343,784.     Specification of Letters Patent.     Patented June 15, 1920.

Application filed October 17, 1916. Serial No. 126,145.

*To all whom it may concern:*

Be it known that we, ERNEST JOHN LEEDING and ALFRED ARNOLD REMINGTON, both subjects of the King of Great Britain, and both residing at Birmingham, in the county of Warwick, England, and, respectively, designer and chief engineer, have invented certain new and useful Improvements in Detachable Treads for Wheels and in Means of Fixing Same, of which the following is a specification.

It is a common experience that wheels of ordinary construction, used with vehicles of the heavier type, while answering their purpose quite satisfactorily when traveling on good roads, are liable to sink deeply into a yielding surface such as when traveling over a bad road or across a field, and to slip on slippery surfaces. To obviate this inconvenience, a number of treads arranged around a wheel have been used, when the wheel has been required to travel over a soft or slippery surface, and these have afforded such extra width of bearing as to greatly lessen the liability of the wheels to sink into soft ground, and have also greatly lessened liability to slip on slippery surfaces.

This invention has for its object to improve the construction of such treads and the means by which they are fixed to a wheel, with a view, more especially, to provide increased width of bearing surface, facility of attachment and detachment of each tread independently of the others, and to enable the treads, when used to cover and bed against an elastic tire or tires, to be readily tightened up against the tire or tires notwithstanding wear of the tire or tires.

Detachable treads for wheels and means of fixing the same, according to this invention, are illustrated by the drawings herewith, in which:—

Figure 1:
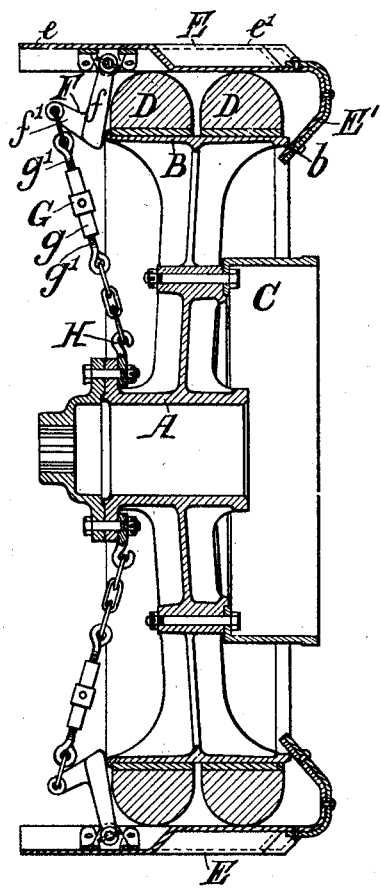
Figure 1 is a vertical section through a wheel to which the invention is applied.
Figure 2:
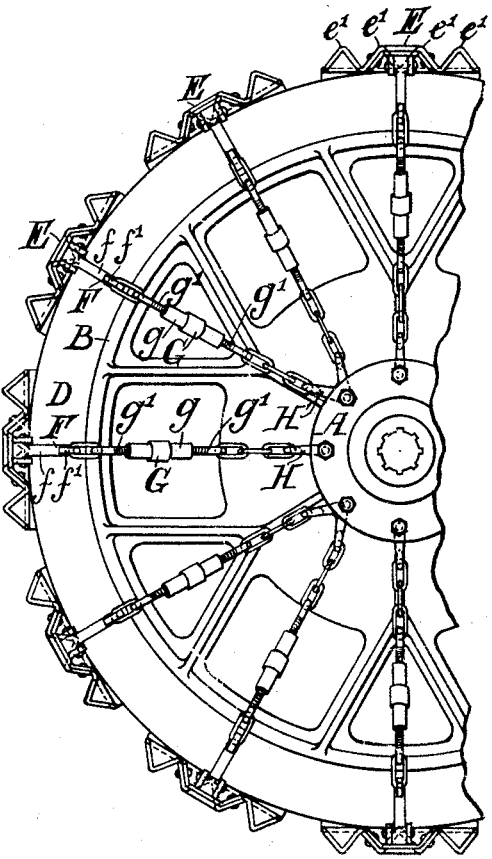
Fig. 2 is an outer face view of the wheel, a considerable portion of the wheel being broken away at the right-hand side thereof.

Referring to Figs. 1 and 2:—The nave A, rim B, and connections between the nave and rim, are of the usual or any convenient construction, a brake-drum C being shown as carried at the inner side of the wheel in the usual manner. D D are the tires, and E E, etc., the treads. Each tread is formed at its end which is at the inner side of the wheel with a bent-back slanting portion E' which, when the tread is in place against the tires, passes slantingly across the inner edge $b$ of the corresponding side of the rim B. The other end $e$ of each tread extends beyond the outer face of the wheel for any desired distance. In connection with each tread an angle-shaped lever F, arranged at the outer side of the wheel, has one arm $f$ thereof pivoted at its outer end to the tread, and each lever F has the other arm $f'$ thereof running in an outward direction from the inner end of the arm $f$. The outer end of each arm $f'$ is connected, through the medium of a screw-device G, with a hook or the like H', which is fixed to the nave A of the wheel such as in the manner shown.

To fix a tread upon the wheel, it is first placed against the tires D, with the slanting portion E' of the tread against the inner edge of the inner side of the rim, as shown by Fig. 1. The screw-device G is then connected with the corresponding hook H or H' and tightened up, thus drawing down the lever F and at the same time pressing it against the outer edge of the rim B, with the result that the portion of the tread with which the arm $f$ of the lever F is directly connected is pulled in tightly against the outer tire D while the arm $f$ turns about the edge of the rim as a fulcrum and draws the tread laterally, thereby drawing the slanting portion E' of the tread farther within the rim and tightening the tread against the other tire. The hooks H H' are arranged in a circle around the axis of the wheel, and at such distance from such axis, as shown, as will insure that any creeping of a tread in relation to the tires will tend to tighten the tread against the tires, whereby, if the screw-devices have been properly tightened up, creeping of the treads around the tires is prevented.

Each screw-device G consists, conveniently, of a socket $g$, having a right and a left-hand screw-thread, which is screwed upon the shanks of eye-bolts $g'$ and these bolts are connected by means of links with the ends of the arm $f'$ and the corresponding hook H, H' respectively, as shown. In the particular arrangement illustrated, the double hooks H' alternate with single hooks H.

Each tread is shown as formed with corrugations $e'$, which run lengthwise thereof, that is to say, parallel with the wheel axis, whereby the tread is considerably strengthened and its grip upon the ground is greatly increased.

Figure 3:
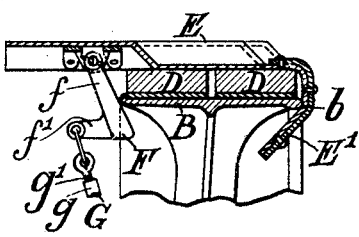
Fig. 3 is a section showing, so far as is necessary, one of the treads in the position it has assumed when the tires have worn down to the maximum degree which admits of the treads being still tightened thereagainst.

Referring to Fig. 3, in which the parts corresponding to those in Fig. 1 are similarly lettered, it will be observed that when a tread is fixed in place after the tires D have become worn down to about the greatest degree to which this is admissible, the slanting portion E' of the tread is drawn, by the action of tightening the tread in place, substantially entirely within the rim B, and that the arm $f$, of the angle-shaped lever F, is drawn, by the corresponding screw-device G, into position in which it slants across the inner edge of the outer side of the rim.

The bent-back slanted portions E' of the treads prevent such treads from being tilted by any pressure which may come against their outer ends, beyond any slight tilting which may be due to yielding of the outer tire under such pressure, and they therefore permit of the treads being of any width which may be desired; and these bent-back ends are useful for such purpose, whatever means may be used at the outer side of a wheel to fix the treads in place.

The use of this invention renders unnecessary any direct connection between the treads.

The means above described of fixing a tread independently of any other tread of a set, enable it to be fixed to the wheel and removed therefrom with great facility.

Having fully described our invention, what we claim and desire to secure by Letters Patent, is:—

1. The combination of a wheel, a tire surrounding the rim thereof, detachable treads each of which is formed with an end turned back in an inclined direction which passes within the rim, and means whereby the other ends of the treads are drawn toward the axis of the wheel, the treads drawn transversely across the rim and the inclined turned-back ends pressed tightly against the edge of the rim for the purpose set forth.

2. The combination of a wheel, a tire surrounding the rim thereof, detachable treads each of which is formed with an end which is turned back in an inclined direction and passes within the rim, levers which are pivotally connected with said treads, respectively, and lie against the side of the rim which is opposite to the side of the wheel where the turned-back ends of the treads enter within the rim, and couplings which connect the body of the wheel to points of said levers which are outward of the edge of the rim against which the said levers lie.

3. In combination, a wheel having a tire surrounding the rim, detachable treads each of which is formed with an end which is turned-back in an inclined direction and passes within the rim, angle-shaped levers which are connected with the treads respectively, and couplings which are connected with the angle-shaped levers respectively and also with the body of the wheel, and press said levers sidewise against the rim and thereby draw the treads tightly against the tire and exert endwise force upon the treads and press the bent-back ends of the treads against the rim.

In witness whereof we have hereunto signed our names this 2nd day of October 1916, in the presence of two subscribing witnesses.

ERNEST JOHN LEEDING.
ALFRED ARNOLD REMINGTON.

Witnesses:
SYDNEY JOHN YOUNG,
JOSEPH HARRY CRUTCHLOW.